United States Patent [19]
Loxley

[11] Patent Number: 5,495,715
[45] Date of Patent: Mar. 5, 1996

[54] ENGINE FUEL METERING SYSTEM

[75] Inventor: Russell A. Loxley, Leicestershire, England

[73] Assignee: Rolls-Royce plc, Derby, England

[21] Appl. No.: 294,342

[22] Filed: Aug. 23, 1994

[30] Foreign Application Priority Data

Sep. 8, 1993 [GB] United Kingdom .................. 9318624

[51] Int. Cl.6 ............................... F02G 3/00; F02C 1/00
[52] U.S. Cl. ......................... 60/734; 60/39.281; 417/202; 417/223
[58] Field of Search .................................. 60/734, 39.281; 417/202, 223

[56] References Cited

U.S. PATENT DOCUMENTS

| | | | |
|---|---|---|---|
| 4,205,945 | 6/1980 | Davis | 417/223 |
| 4,339,917 | 7/1982 | LaGrone | 60/39.281 |
| 4,347,041 | 8/1982 | Cooper | 417/223 |
| 4,607,486 | 8/1986 | Cole | 60/734 |
| 4,864,815 | 9/1989 | Cygnor | 60/734 |
| 5,116,362 | 5/1992 | Arline et al. | 60/734 |
| 5,118,258 | 6/1992 | Martin | 60/734 |
| 5,152,146 | 10/1992 | Butler | 60/734 |
| 5,156,001 | 10/1992 | Mouton | 60/734 |
| 5,159,808 | 11/1992 | Kast | 60/734 |
| 5,203,174 | 4/1993 | Meyer | 60/734 |
| 5,241,826 | 9/1993 | Stearns | 60/734 |

FOREIGN PATENT DOCUMENTS

| | | | |
|---|---|---|---|
| 0286299 | 10/1988 | European Pat. Off. | 60/734 |
| 762328 | 11/1956 | United Kingdom . | |
| 1205553 | 9/1970 | United Kingdom . | |
| 1342733 | 1/1974 | United Kingdom . | |

*Primary Examiner*—Richard A. Bertsch
*Assistant Examiner*—Howard R. Richman
*Attorney, Agent, or Firm*—Cushman Darby & Cushman

[57] ABSTRACT

The amount of fuel supplied by a low pressure pump and a high pressure pump to combustion means is controlled by a control unit. If most of the fuel delivered by the pumps is required by the engine a clutch engages to provide a direct mechanical drive between the pumps so that they are driven at the same speed. However if the combustion equipment requires a reduced flow of fuel the clutch disengages and the excess fuel is diverted by a valve to a turbine. The turbine drives the low pressure pump at a higher speed than the speed of the high pressure pump. The energy of the diverted fuel is converted to mechanical energy to drive the turbine so that the temperature rise of the diverted fuel is reduced.

7 Claims, 1 Drawing Sheet

ENGINE FUEL METERING SYSTEM

FIELD OF THE INVENTION

The present invention relates to a fuel metering system and in particular to a fuel metering system for use with a gas turbine engine.

BACKGROUND OF THE INVENTION

Fuel systems for gas turbine engines meter the flow of fuel so that the required quantity is provided at all engine operating conditions. One or more fuel pumps are used to deliver fuel to the fuel spray nozzles which inject it into the combustion system in the form of atomised spray. For simplicity fixed positive displacement pumps such as gear pumps are used to deliver the fuel to the spray nozzles. The gear pumps have a fixed displacement and are driven by the engine gear train. The output of the pump is therefore directly proportional to the speed of the engine. The fuel flow to the spray nozzles is controlled by recirculating any fuel in excess of the engines requirements back to the pump inlet. A valve, sensitive to the pressure drop across the controlling units, in the system opens and closes as necessary to increase or decrease the amount of fuel recirculated.

A problem with fuel pumping systems which utilise fixed displacement pumps is that the pumps have to supply sufficient fuel for maximum thrust and so have a very high excess capacity at idle. This excess capacity results in the fuel reaching high temperatures. Variable speed drives or variable capacity pumps could be used to reduce the temperature rise however these would introduce mechanical complexity and unreliability.

SUMMARY OF THE INVENTION

The present invention seeks to provide a fuel pumping system which retains the simplicity of gear pumps or other fixed displacement pumps but which recovers the energy from the spill flow at idle to reduce the temperature rise of the fuel.

According to the present invention a fuel metering system for varying the supply of fuel to an engine comprises a fuel tank, a first fuel pump having an inlet connected to the fuel tank and an outlet connected to an inlet of a second fuel pump, the second fuel pump being of the fixed displacement type, delivery control means connected to an outlet of the second fuel pump to control the amount of fuel supplied to the engine and to divert fuel in excess to the engine requirements back to the inlet of the second pump, the second fuel pump being driven at a speed proportional to the speed of the engine, the first fuel pump being selectively driven by either a mechanical drive between the first and second pump or by a variable speed drive, clutch means being provided to selectively provide the mechanical drive between the first and second pumps, whereby in operation if delivery control means detects that most of the fuel delivered by the first and second fuel pumps is required by the engine a small proportion of the fuel is diverted and the clutch means engages to provide the direct mechanical drive between the first and second pumps so that the first pump is driven at the same speed as the second pump, however if the delivery control means detects that most of the fuel delivered by the first and second fuel pumps is not required by the engine the clutch means disengages and a large proportion of the fuel is diverted, the energy of the diverted fuel being used to drive the variable drive of the first pump at a speed higher than the speed of the second pump.

Preferably the energy of the diverted fuel is used to drive a turbine connected to the variable drive of the first pump which drives the first pump at a speed higher than the speed of the second pump.

In the preferred embodiment of the present invention the second pump is a gear pump which may be driven by a gear train from the engine. The first pump is preferably a centrifugal pump and the turbine may be a integral part of the first pump.

Preferably a valve controlled by the delivery control means diverts the excess fuel to the turbine. In the preferred embodiment of the present invention the valve is a variable geometry nozzle.

A heat exchanger and a filter may be provided in the metering system adjacent the inlet to the second pump so that fuel passes through the heat exchanger and filter before passing through the second pump.

Preferably the clutch means is an automatic clutch which operates in response to the difference between the rotational speeds of the first and second pumps. The automatic clutch may be a sprag clutch.

A metering system in accordance with the present invention is preferably for use in a gas turbine engine.

BRIEF DESCRIPTION OF THE DRAWINGS

The present invention will now be described with reference to the accompanying drawing which is a schematic illustration of a fuel metering system in accordance with the present invention.

DETAILED DESCRIPTION OF THE INVENTION

Figure 1:
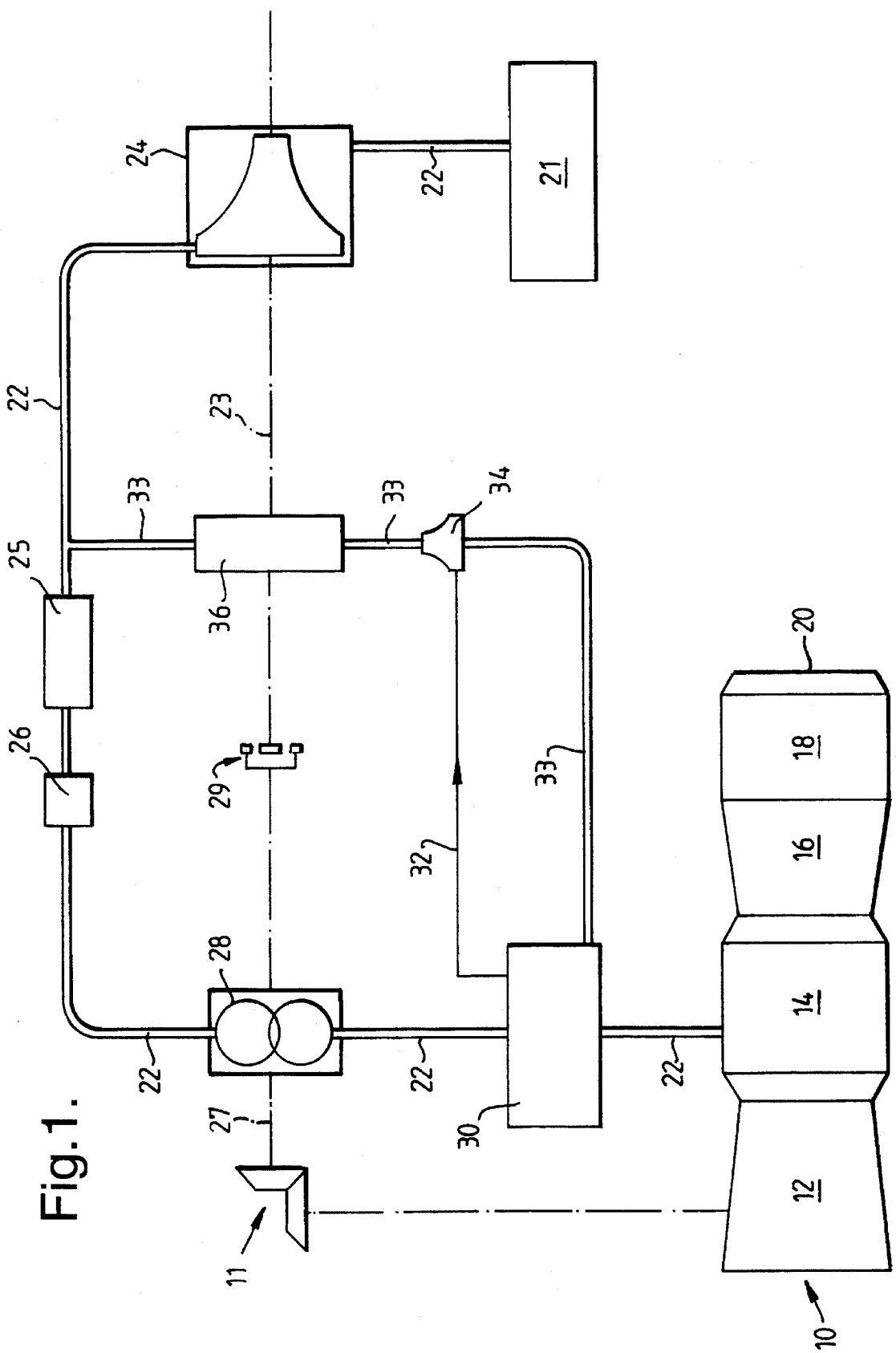

Referring to the drawing a gas turbine engine 10 comprises compressor means 12, combustion equipment 14, turbine means 16, a jet pipe 18 and a nozzle 20 in axial flow series.

Fuel is supplied to the combustion equipment 14 from a fuel tank 21 along a main fuel supply line 22 which includes a low pressure pump 24, heat exchanger 25, filter 26, a high pressure pump 28 and a fuel control unit 30.

The high pressure pump 28 is a fixed positive displacement pump. In the preferred embodiment of the present invention the high pressure pump 28 is a gear pump which is driven by a shaft 27 powered by a gear train 11 of the engine 10. The output of the pump 28 is therefore directly proportional to the speed of the engine 10.

The low pressure pump 24 is a centrifugal pump which is driven by shaft 23. Shaft 23 is driven by either the gear pump 28 or a turbine 36. The centrifugal pump 24 is driven by the gear pump 28 when a clutch 29 engages to connect shafts 27 and 23. When the clutch 29 disengages the turbine 36 drives the shaft 23 to power the centrifugal pump 24.

It will be appreciated by one skilled in the art that any form of clutch 29 could be used to select whether the shaft 23 is driven by the gear pump 28 or the turbine 36, the clutch 29 engaging or disengaging in response to a control input from the control unit 30. However in the preferred embodiment of the present invention the clutch 29 is a sprag clutch which operates automatically in response to the difference between the relative speeds of rotation of the shafts 23 and 27. The sprag clutch 29 operates so that the shaft 23 can run faster but not slower than the shaft 27.

The sprag clutch 29 comprises an outer race and an inner race attached to shafts 27 and 23 respectively, Specially shaped sprags are located in the annular space between the concentric inner and outer races. When the shaft 23 rotates at a higher speed than the shaft 27 the sprags are tilted and the clutch 29 disengages so that no power is transmitted between the races. When the speed of the shaft 23 drops to the same speed as the shaft 27 the sprag clutch engages and power is transmitted from one race to the other by the wedging action of the sprags between the races.

The control unit 30 determines how much fuel the engine requires from various engine parameters. The control unit 30 recirculates any fuel in excess to the engine 10 requirements back to the inlet of the gear pump 28.

The amount of fuel diverted through the supply line 33 is controlled by a valve 34 which in the preferred embodiment of the present invention is a variable geometry nozzle 34. The geometry of the nozzle 34 changes to increase or decrease the amount of fuel recirculated. The geometry of the variable nozzle 34 changes in response to a control signal 32 from the control unit 30.

The energy of the diverted fuel drives a turbine 36 before being recirculated to the inlet of the gear pump 28.

In operation fuel is pumped through the main supply line 22. The fuel passes from the centrifugal pump 24 to the heat exchanger 25 which puts the fuel in heat exchange relationship with the engine oil. Heat can be transferred from the oil to the fuel to prevent icing problems or vice versa to cool the fuel. The fuel is then filtered by the filter 26 before passing to the inlet of the gear pump 28.

When the engine is operating at cruise or at idle most of the fuel fuel supplied by the pumps 24 and 28 is not required by the combustion equipment 14. The control unit 30 sends a signal 32 to change the geometry of the nozzle 34 to allow the excess fuel through the supply line 33 to the turbine 36. The energy of the diverted fuel drives the turbine 36 and increases the rotational speed of the shaft 23. The sprag clutch 29 disengages and the turbine 36 rotates the shaft 23 and the centrifugal pump 24 at a higher speed than the gear pump 28. The diverted fuel then rejoins the main fuel supply line 22 and passes via the heat exchanger 25 and filter 26 back to the inlet of the gear pump 28.

When the engine is operating at maximum thrust most of the fuel supplied by the pumps, 24 and 28, is required by the combustion equipment 14. The control unit 30 sends a signal 32 to change the geometry of the nozzle 34 so that only a small proportion of the fuel flow is diverted through supply line 33. As the amount of fuel diverted to the turbine 36 reduces the shaft 23 slows down. The sprag clutch 29 engages to provide a mechanical drive between the pumps 24 and 28. The gear pump 28 is driven by the engine gear train 11 at a speed proportional to the rotational speed of the engine 10. The centrifugal pump 24 is driven at the same speed as the gear pump 28 by the mechanical drive.

A fuel metering system in accordance with the present invention offers the advantage that the energy of the diverted fuel is converted to mechanical energy to drive the turbine 36 and the temperature rise of the diverted fuel is thus reduced. The turbine 36 provides the centrifugal pump 24 with a variable drive which means the size of the centrifugal pump 24 can be chosen to meet the requirements of the fuel system.

I claim:

1. A fuel metering system for varying the supply of fuel to an engine comprising a fuel tank, a first fuel pump having an inlet connected to the fuel tank and an outlet connected to an inlet of a second fuel pump, the second fuel pump being of the fixed displacement type, delivery control means being connected to an outlet of the second fuel pump to control the amount of fuel supplied to the engine and to divert fuel in excess to the engine requirements back to the inlet of the second pump, the second pump being driven at a speed proportional to the speed of the engine, the first pump being selectively driven by either a mechanical drive between the first and second pumps or by a variable drive, automatic clutch means being provided which operates in response to the difference between the rotational speeds of the first and second pumps to selectively connect the mechanical drive between the first and second pumps, whereby in operation if the delivery control means detects that the fuel delivered by the first and second fuel pumps is required by the engine the automatic clutch means engages to provide a direct mechanical drive between the first and second pumps so that the first pump is driven at the same speed as the second pump, however if the delivery control means detects that the first and second pumps are delivering fuel in excess to the engine requirement the automatic clutch means disengages and the fuel in excess to the engine requirements is diverted, the energy of the diverted fuel being used to drive the variable drive of the first pump at a speed higher than the speed of the second pump.

2. A fuel metering system as claimed in claim 1 in which the energy of the diverted fuel is used to drive a turbine connected to the variable drive of the first pump.

3. A fuel metering system as claimed in claim 1 in which the second pump is a gear pump driven by a gear train from the engine at a speed proportional to the speed of the engine.

4. A fuel metering system as claimed in claim 1 in which a heat exchanger and a filter are provided in the metering system adjacent the inlet to the second pump so that the fuel passes through the heat exchanger and filter before passing to the second pump.

5. A fuel metering system as claimed in claim 1 in which the automatic clutch is a sprag clutch.

6. A fuel metering system as claimed in claim 1 in which a valve controlled by the delivery control means diverts the excess fuel to a turbine connected to the variable drive of said first pump.

7. A fuel metering system as claimed in claim 6 in which the valve is a variable geometry nozzle, the geometry of then nozzle being controlled by the delivery control means.

* * * * *